United States Patent [19]
Harlow, Jr. et al.

[11] Patent Number: 5,429,682
[45] Date of Patent: Jul. 4, 1995

[54] AUTOMATED THREE-DIMENSIONAL PRECISION COATINGS APPLICATION APPARATUS

[75] Inventors: Albert L. Harlow, Jr., Chagrin Falls, Ohio; Richard E. Bechtold, Hunt Valley, Md.; David Parker, Orem, Utah; Francis L. Merat, University Heights, Ohio; Mark Podany, Parma Heights, Ohio; Raymond C. Laning, Chagrin Falls, Ohio

[73] Assignee: Advanced Robotics Technologies, Chargin Falls, Ohio

[21] Appl. No.: 109,312

[22] Filed: Aug. 19, 1993

[51] Int. Cl.6 .................. B05C 5/02; B25J 19/00; B25J 9/02; G06F 19/00

[52] U.S. Cl. .................. 118/681; 118/316; 118/687; 118/695; 118/712; 364/474.29; 901/7; 901/43; 901/47

[58] Field of Search ............... 118/681, 687, 695, 698, 118/704, 712, 313, 315, 316; 427/256; 901/7, 43, 47; 364/474.03, 474.05, 474.28, 474.29

[56] References Cited

U.S. PATENT DOCUMENTS

| | | |
|---|---|---|
| 3,674,207 | 7/1972 | Carbonetti, Jr. et al. ............ 239/69 |
| 4,171,097 | 10/1979 | Rebold ................. 239/241 |
| 4,178,740 | 12/1979 | Grosm et al. ............ 53/556 |
| 4,291,520 | 9/1981 | Prince et al. ............ 53/551 |
| 4,353,677 | 10/1982 | Susnjara et al. ............ 414/735 |
| 4,448,820 | 5/1984 | Buschor ................ 427/424 |
| 4,454,456 | 6/1984 | Hauser ................ 239/332 |
| 4,486,843 | 12/1984 | Spongh et al. ............ 395/92 |
| 4,508,271 | 4/1985 | Gress ................ 239/305 |
| 4,593,360 | 6/1986 | Cocks ................ 364/468 |
| 4,614,300 | 9/1986 | Falcoff ................ 239/71 |
| 4,663,720 | 5/1987 | Duret et al. ............ 364/474.05 |
| 4,714,635 | 12/1987 | Mochizuki et al. ............ 427/421 |
| 4,754,923 | 7/1988 | Matusita et al. ............ 239/68 |
| 4,758,849 | 7/1988 | Piatt et al. ............ 346/140 R |
| 4,864,966 | 9/1989 | Anderson et al. ............ 118/668 |
| 4,941,182 | 7/1990 | Patel ................ 901/43 |
| 4,967,127 | 10/1990 | Ishiguro et al. ............ 364/474.03 X |
| 4,982,897 | 1/1991 | Matusita et al. ............ 239/71 |
| 5,086,978 | 2/1992 | Fertig ................ 239/305 |
| 5,088,864 | 2/1992 | Yanagida ............ 364/474.29 X |
| 5,114,752 | 5/1992 | Hall ................ 427/273 |
| 5,141,165 | 8/1992 | Sharpless et al. ............ 239/752 |

FOREIGN PATENT DOCUMENTS 215018 10/1984 Germany ................ 118/698

Primary Examiner—Robert J. Warden
Assistant Examiner—L. M. Crawford
Attorney, Agent, or Firm—Ware, Fressola, Van Der Sluys & Adolphson

[57] ABSTRACT

A surface of a 3-D object is digitized automatically and stored in a memory. Based on the signal representation of the 3-D object areas of the surface are defined for color and boundaries. Coatings application paths are defined within each area and various parameters for applying coatings for each point in each path are also defined including spray pattern, amount of coatings to be applied, speed of application along the path, among others; for each area, the points of the selected path are correlated with the angle of attack, spray pattern, amount of coatings and speed. A set of programmed instructions are compiled for execution in a general purpose computer. An assembly line of objects to be painted may then be set up and the retrieved instructions executed.

10 Claims, 15 Drawing Sheets

□ – ROBOT LOCATION

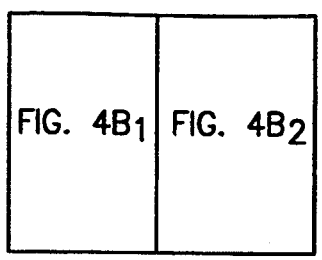
FIG. 4B
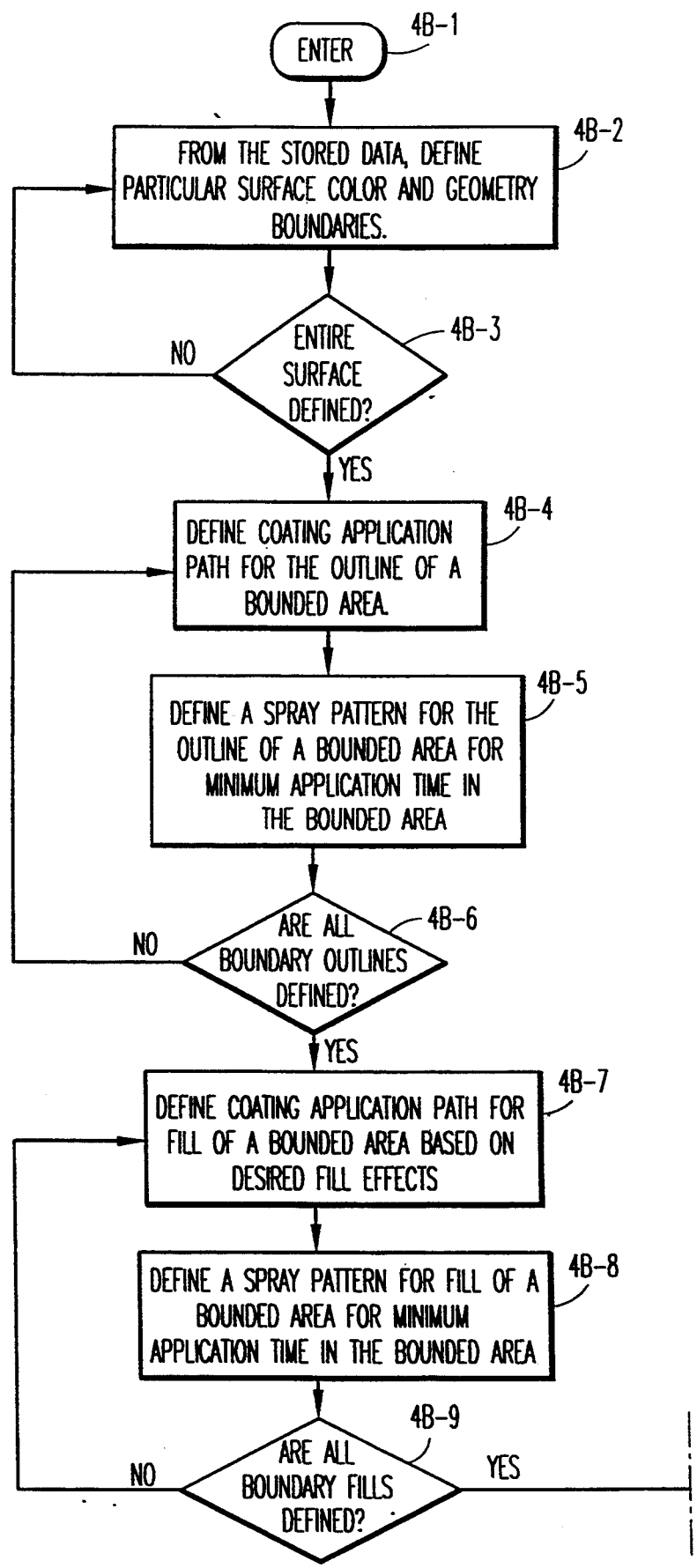
FIG. 4B₁

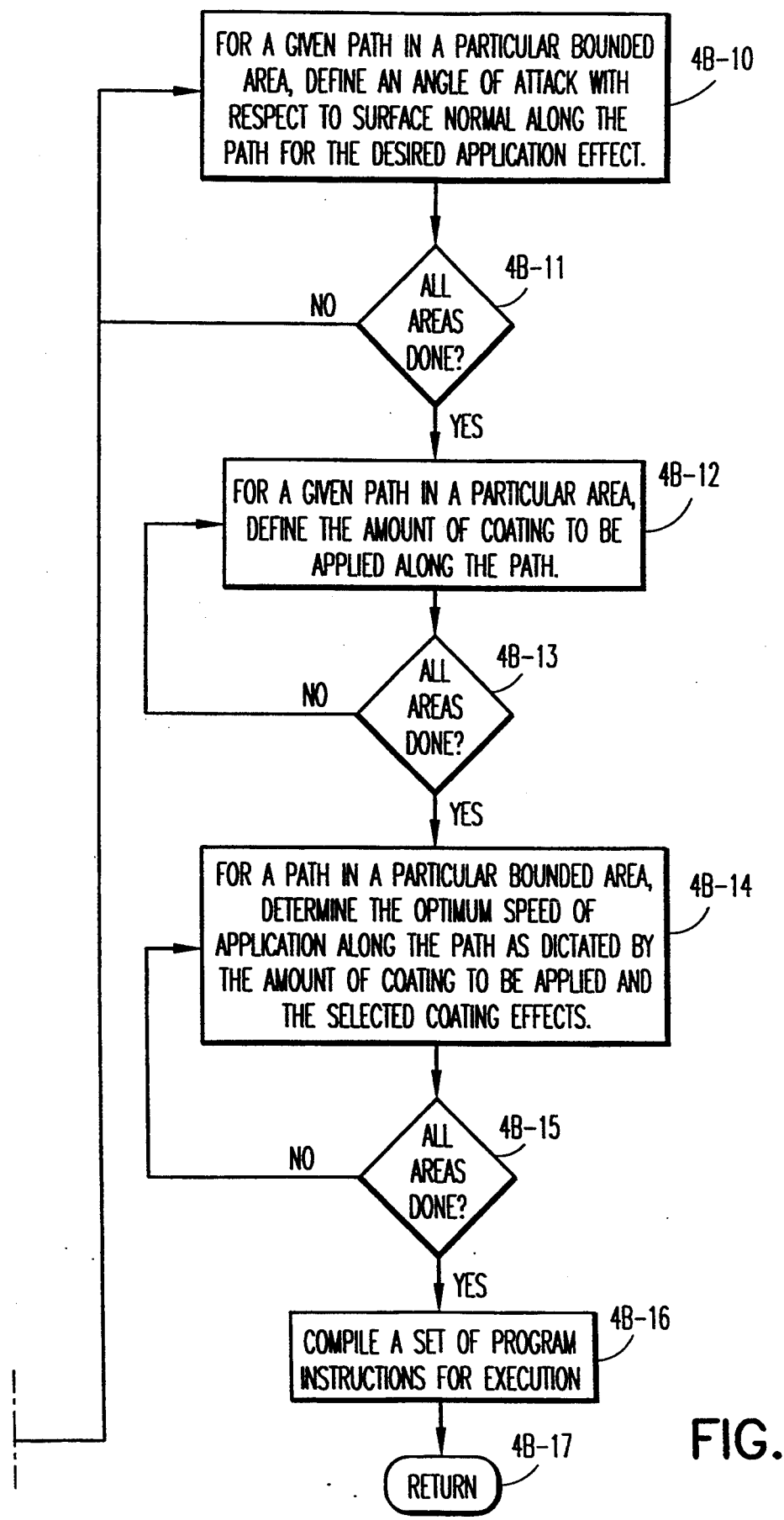
FIG. 4B₂

PULSE POSITION MODULATION (PPM)

$t_{on} = 200 \mu S$

A.

B.

$t_{off} = 600 \mu S,$
$T = 2,200 \mu S, \; \nu = 455 HZ$ $t_{off} = 1,400 \mu S$
$T = 3,000 \mu S, \; \nu = 333 HZ$

C.

$t_{off} = 2.8 mS$

PULSE WIDTH MODULATION (PWM)

$t_{on} = 1 mS$

D.

$t_{on} = 600 \mu S$

E.

$t_{on} = 400 \mu S$

F.

AUTOMATED THREE-DIMENSIONAL PRECISION COATINGS APPLICATION APPARATUS

TECHNICAL FIELD

This invention relates to robotic coatings application and, more particularly, to automatic application of coatings to a selected art work configuration.

BACKGROUND OF THE INVENTION

A robotic airbrush apparatus is known from U.S. Pat. No. 4,864,966 to Anderson et al. In that disclosure, a robotic airbrush apparatus is shown that applies color, pigment or coatings to a two-dimensional surface in accordance with a preselected art work configuration. The apparatus comprises in combination a robotic arm, a support for the arm, an airbrush mounted on the arm, a quill having an open free end and a proximal end attached in fluid communication with the airbrush, a coatings pod acceptably bored for sliding engagement of the quill, a sensor mounted on the arm for determining the presence of the coatings pod, a coatings reservoir connected to the coatings pod by means of a flexible conduit, and a computer program, such as a punched mat, for movement of the robotic arm in open engagement of the quill and coatings pod and for movement of the airbrush together with the engaged quill and coatings pod in accordance with the preselected art work configuration. The apparatus also comprises a control valve on the airbrush and adjustable lever for opening and closing the control valve to adjust the amount of coatings to be projected through the airbrush. Programmable instructions are also provided for the robotic arm to activate the lever on the airbrush. The above described technique has only been applied to two-dimension, e.g., for painting t-shirts.

Although robots have found widespread application in spray coating, no known process or product is available for controlling robotic movement in precision coating applications automatically through an independent programming technique, except that which has been described above. In this context, precision coatings is interpreted to mean lines on the order of several millimeters or less in width. Robotic spraying technology is used extensively in industry, especially in the automotive industry. However, these applications are actually large area coating applications. In the case of the automotive industry, the application is to produce a uniform coating over an extensive area rather than a detailed coating in a small area. As a result, present robot end effectors for coatings application are nothing more than large area sprayers capable of being mounted on a robot arm. Because of the large area being sprayed, this can in effect be construed as a two-dimensional surface with respect to the sprayer. Prior art describes programming of the robot in ways such as punched mats, paper tape and magnetic media. This can be defined as "static programming" techniques wherein a programmer must manually key-in instructions, sequences and commands which control robotic movement and operation. The major disadvantage with this static programming technique is that it is time consuming, ties up resources and requires specialized knowledge. Such tying up of resources includes the inability to profitably use the equipment as it was intended during the programming period. Because of the inability to use available resources, profitably and overall manufacturing throughput are severely impacted.

DISCLOSURE OF INVENTION

An object of the present invention is to provide an automated, precision coatings application technique and apparatus.

Another object is to provide such an apparatus and method for flexible manufacturing systems which includes a dynamic programming environment for ease of system use.

According to the present invention, an art work configuration is subjected in advance or is subjected as part of the process to a rapid 3-D color digitizing process whereby the three-dimensional surface and color information of the object is stored in a memory. That stored information is then automatically manipulated to provide robot programmed instructions. By providing the robot programmed instructions through this technique, it is not required that the robot be taken out of service for programming since the new instructions can be downloaded into the robot's controller while the robot is still operating on the production floor. The programmed instructions are provided to at least one articulated arm having a computer-controlled coatings applicator, spray-gun, airbrush or the like mounted thereon for providing a coating or plurality of coatings to the surface of the object in a selected area or areas thereof.

In further accord with the present invention, a plurality of coatings is supplied through flexible conduits to the coatings applicator for dynamic high-speed real-time coating switching. This feature allows for multiple coatings of differing pigmentations to be applied through an applicator. The system may allow for rapid purging of the currently selected coating to a newly selected coating; thereby eliminating other known means for coating changeover which are considerably more time consuming.

In still further accord with the present invention, a plurality of objects having the art work configuration are provided in an automated fashion to the articulated arm for having the coating or coatings applied thereto in an automated fashion.

Thus, according to the present invention, a surface of a three-dimensional object is automatically measured and the dimensions and color information are stored in a memory. Using that information, a plurality of areas of the surface of the measured object are then selected for application of a corresponding plurality of differently pigmented coatings; and, for each selected area, a coatings application path of points along the surface is provided and stored.

In further accord with the present invention, the coating application path of points along the surface that has been provided is then downloaded into the robot controller and subsequently translated into a series of motions of an automated coatings applicator for the application of the coating to the surface along the application path. For each selected area, the three-dimensional object is oriented with respect to the automated coatings applicator and the coatings applicator is itself oriented for applying the corresponding pigmented coating at each point of the coatings application path.

In still further accord with the present invention, the amount of coating being applied to the 3-D surface is controlled along the application path. This may be done by pulse width modulation of a valve supplying the coatings applicator, by pulse position modulation, or by electronic proportional control, in conjunction with control of the applicator's velocity with respect to the surface being coated.

In accordance still further with the present invention, a precision electronically controlled coating applicator (PECA) is a device whose air and fluid flows are controlled electronically, allowing precise amounts of coatings to be metered onto the surface being coated. The spray pattern is controlled also electronically as to the solid angle of coating being deposited. This provides for a varying degree of detail, depending on the part of the object being coated. If a large area is being coated with a uniform pigment, a wide spray pattern may be selected for that part of the path. If the particular area in question is to be coated with precisely defined areas, a narrow spray pattern is selected.

According still further to the present invention, for each point in each coating application path, an offset angle from the normal to the surface at that point for applying the coating to the surface is determined. The control of the angle is determined for the desired coating effect; such as sharply delineated areas of coating or feathering, i.e., a gradient from a coated area to an uncoated area. This allows user-defined control of the over-all artistic quality of the coating, however desired, without the need for direct hands-on communication to the robot applicator.

In accordance still further with the present invention, for each coating application path, or portion thereof, a velocity is determined for applying the coating along the path.

In still further accord with the present invention, the acceleration and/or deceleration of the coatings applicator along the path may be controlled.

The present invention has many advantageous industrial and commercial applications. For example, automated precision coatings such as for use in decorating simple or complex 3-D surfaces. Objects may include decorative/decoy animals, realistic human figures or mannequins, realistic animal figures, toys, 3-D statues, sculptures, art pieces, 3-D reliefs on wood for furniture, wood carvings, 3-D relief medallions, pins, plaques, etc. It may also include application of conductive inks for printed circuit board fabrication or automotive windshield defroster elements or for electromagnetic interference, radio frequency interference, shielding applications in electronic systems. The present invention also provides a method by which a masking material could be employed in the applicator and applied to a surface to replace currently employed tedious hand-applied or semiautomatic masking techniques, e.g., jet engine turbine parts.

Another advantage of the invention is the reduction of wasted coating materials which are more precisely applied using this disclosed technique. In the instance where objects are coated using metal masks, as in the prior art, a substantial amount of the coating ends up on the mask itself which is then washed in a solvent whose toxic sediment needs to be disposed of. The necessity of using this environmentally contaminating process is eliminated through the use of the invention disclosed herein.

Through use of the techniques described herein (specifically the use of the color digitizer in conjunction with software), a manufacturer has an off-line, time-efficient method in which to compile instructions to control the motions of the system's equipment. Other techniques used to program or control motion require specialized knowledge in the equipment's programming language and readily available equipment for testing and verifying instructions. Through the use of the method disclosed herein, tool paths may be generated automatically and verified on a monitor displaying representative models of the equipment and object to be coated.

Another distinct advantage of the invention is the system's flexibility. Because of the ease of creating programmed instructions to control the equipments' motion and function, with specially designed universal workpiece holders, a visual recognition device, and a wide range and/or high degrees of freedom in equipment, any object within certain parameters may be recognized, addressed and coated by the system. This is especially useful to those manufacturers which require that a large number of different objects be coated on the same equipment. These objects may be similar in geometrical shape but different in coating design, for instance. This flexibility also allows the types of like objects produced during a production run to be varied.

These and other objects, features and advantages of the present invention will become more apparent in light of the following detailed description of a best mode embodiment thereof, as illustrated in the accompanying drawing.

BRIEF DESCRIPTION OF THE DRAWING

FIGS. 4A and 4B show a series of steps which may be carried out to digitize and manipulate the digitized representation of the surface of the 3-D object, select areas of the surface for application of particular colors, determine coatings application paths for each area, calculate angles of attack with respect to the surface normals along the path in each area, define a spray pattern along the path in each area, define the amount of coatings to be applied along the path in each area, define the speed of application along the path in each area and for each area, correlating the points of the selected path with the angle of incidence, spray pattern, amount of coatings and speed selected for the points along the path, compiled in a set of programmed instructions for execution, according to the present invention.

BEST MODE FOR CARRYING OUT THE INVENTION

Figure 1:
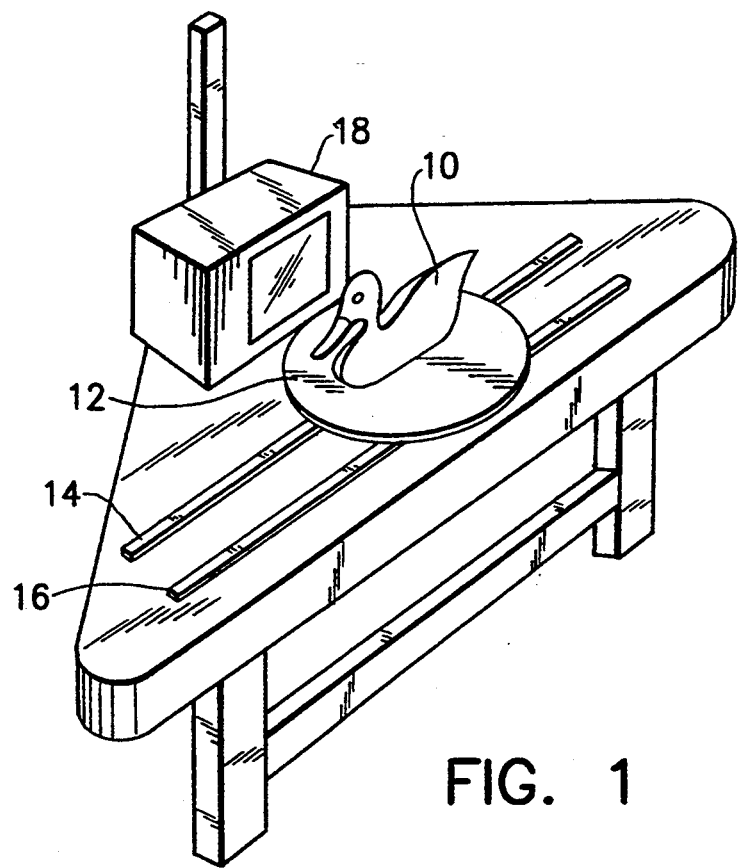
FIG. 1 shows a 3-D color digitizing station for digitizing in three-dimensions an object, according to the present invention.

Referring now to FIG. 1, because of its complexity in surface geometry and color make-up, a decoy-type duck is used to illustrate the process, shown in simplified form. It should be realized, however, that the duck is selected merely by way of illustration and the invention is certainly not limited thereto, but is widely applicable to any type of 3-D object. It should also be realized that a typical mallard type decoy duck, for example, has a length of about sixteen and one-half inches, a width of about six and one-half inches and a height of about seven inches and requires a highly specialized coatings application technique in a plurality of blends and colors; in shades of black, white, light brown, dark brown, green, dark green, blue, gray, yellow, for example. Many details are required and such coating has to be done ordinarily by hand in known techniques described in the prior art. According to the present invention, automated duplication of decorative coating is done through the use of three-dimensional color digitizing and conversion of the digitized representation to a form executable by robotic coatings applicators. A functional specification for carrying out such digitizing and conversion is reproduced in the Appendix hereof.

The first step in a process according to the invention is to place the object 10 to be decoratively painted upon a table 12 which may be a turntable and which may also be moveable on tracks 14 and 16 so as to enable a digitizer 18 to scan the full surface of the object 10. The digitizing process is carried out in three-dimensions by a digitizer such as a Cyberware 3030/RGB Color 3-D Digitizer obtained from Cyberware Laboratory Inc., 8 Harris Court 3D, Monterey, Calif. 93940. The object is digitized using a rapid 3-D digitizer utilizing a process whereby the object's shape and color are recorded simultaneously. For example, a plane of laser light is projected onto the surface of the object 10 from the digitizer 18 and a combination of video sensors within the digitizer 18 record several hundred points along that line as well as the color at each of those points on the surface of the object. This information is stored in a memory file on a computer storage medium. The storage medium may be a memory such as a RAM, an EEPROM, a magnetic hard disc, an optical disc or the like. The stored raw data is then processed by a program to reduce the amount of data produced by the scanner for the most efficient utility of system resources. Data points in areas where little or no geometric or color changes occur are eliminated to yield a reduced data description set of the object.

Figure 2:
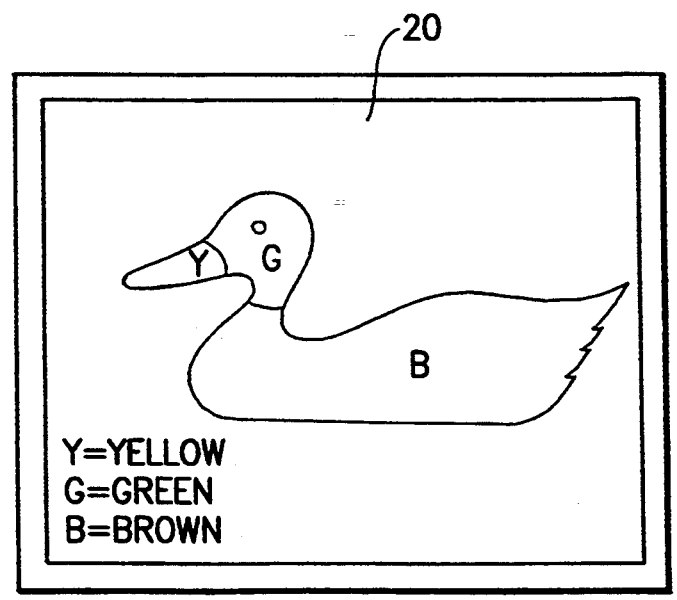
FIG. 2 shows a display screen connected to the digitizing station of FIG. 1 wherein different regions of the object are defined as to color boundaries and geometric delineations, according to the present invention.

As shown in FIG. 2, the reduced data set is then viewed on a display 20 for use by an operator who may then edit and/or manipulate through specially written software this data set in order to achieve the desired product appearance and ultimate coating result. A region of color can be outlined, for example, a yellow (Y) area on the duck's beak, a green (G) area at his head area and a brown (B) area for the rest of the body. This is of course shown in simplified form because as mentioned above there would be many different colors requiring a large amount of detail.

The regions of color can be outlined using a technique whereby the boundaries are drawn onto the surface of the shape or the boundaries are found automatically by means of shade hue thresholding and/or edge detection. A manual override may of course be provided to define anomalous areas. This process defines various bounded color areas for automated coating to be described below.

Figure 3:
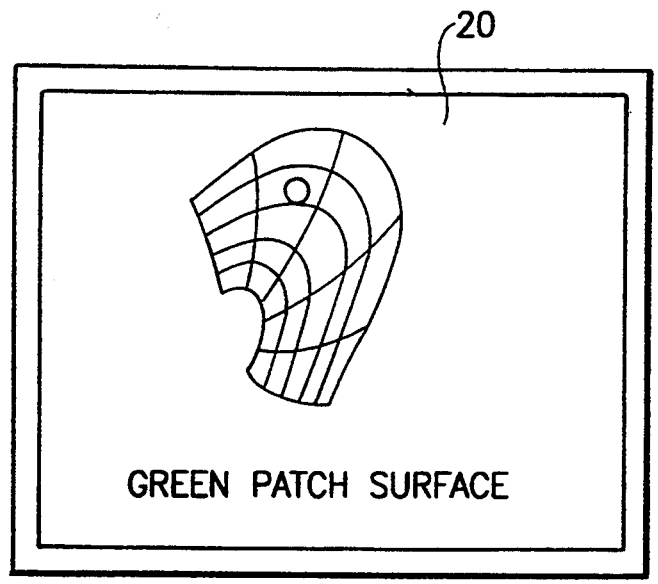
FIG. 3 shows the display of FIG. 2 wherein one of the defined color areas or "color patches" is displayed with different geometric contours defined, according to the present invention.

Referring now to FIG. 3, the green head portion of the duck is shown in detail as it would be seen by the operator on his display screen 20. The bounded area illustrated may be processed by fitting the data inside the boundaries shown with either bezier or non-uniform rational b-spline techniques to create a mathematical model whereby coating path manipulation can be greatly enhanced. Once the surface has been defined, the color is then selected from a predefined or customized palette of coating colors using the recorded color as a guide. This may be done both manually or automatically.

Figure 4:
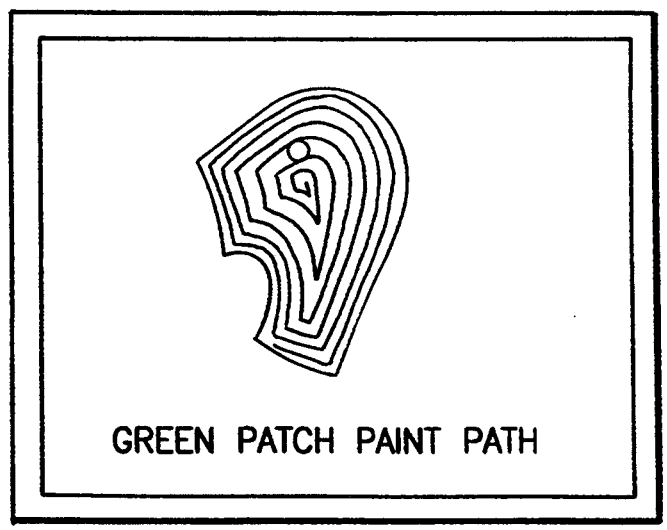
FIG. 4 shows the area of FIG. 3 having a coating path defined, i.e., through software interpretation, according to the present invention.

Referring to FIG. 4, a coatings path configuration is then defined describing the pattern, direction and type of coverage for optimized application time. Offset angles from the surface normals (angles of incidence) are calculated at this point in time to define the direction the applicator will be pointing at the surface at various points along the path. This is an important teaching of the present invention. Distances away, speeds and angles from the surface define the type and amount of coverage.

Figure 4A:
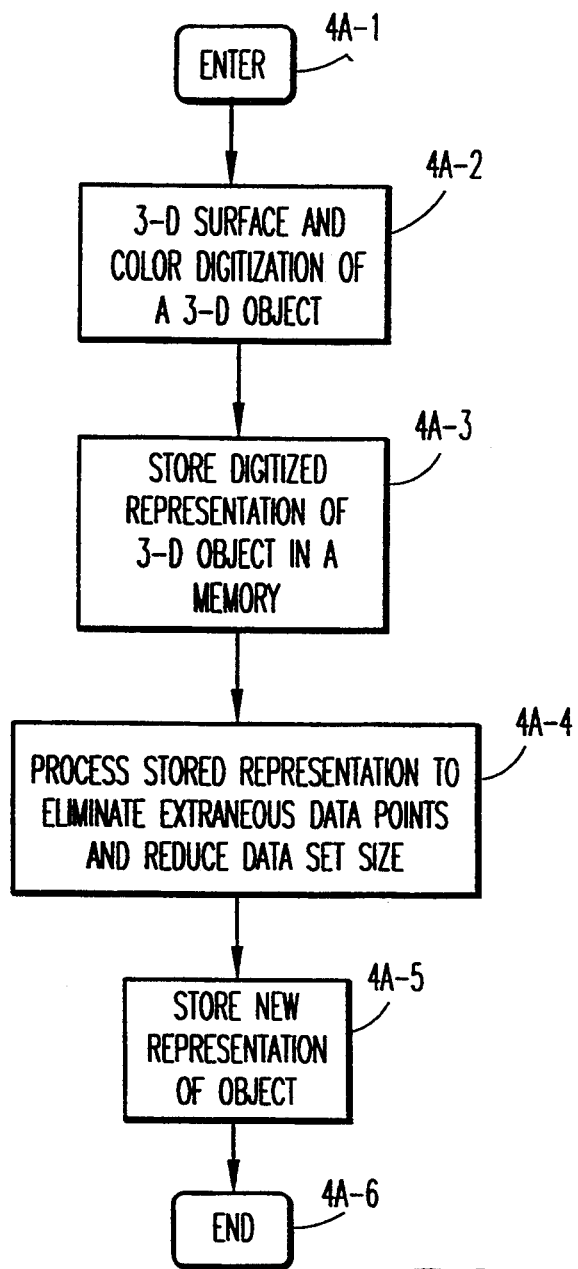

FIG. 4A shows a method for digitizing the 3-D object for carrying out the present invention. After entering in a step 4A-1, the surface of the object to be duplicated is digitized in a step 4A-2 and the data representing the surface geometry and color is stored in a memory as shown in step 4A-3. Once the data representing the surface geometry and color has been stored in a memory, it can then be displayed as illustrated in FIG. 2. Step 4A-4 eliminates extraneous data through a processing step that determines how quickly a geometric or color change is occurring over an area of this object. Data reduction of this sort is important because of the nature of the objects being digitized, objects of simple geometries and color changes will be represented by an immense amount of data. Reduction of the data set size will allow for faster processing and program implementation in later steps. The reduced data set is then stored as shown in a step 4A-5, after which the process is concluded in a step 4A-6.

FIG. 4B shows a method of manipulating the data representation of the 3-D object to allow "tuning" of the application patterns. After entering in a step 4B-1 and displaying the reduced object definition data set obtained in steps 4A-1 through 4A-6, the software then determines delineations between geometric and color boundaries until all areas of the 3-D object have been delineated in steps 4B-2 and 4B-3. Boundary outline paths and spray patterns are then defined in steps 4B-4 through 4B-6 according to a predefined of set of application effects for the boundary lines. The paths and spray pattern definitions are determined by an algorithm that optimizes the time required to execute a particular path and spray pattern combination. Steps 4B-7 through 4B-9 define the coating application path and spray pattern to fill the bounded areas based on the desired fill effects. These steps (4B-4 through 4B-9) allow the user to define coated regions with effects such as sharply defined edge boundaries, feathered (gradient) edges, internal color gradients or adjustments to the amount of paint being applied (color intensity). For a particular coating effect, the angle of incidence with respect to the surface normal at a particular point must be determined. This process is accomplished in steps 4B-10 and 4B-11.

According to the algorithmic approach defined in the Appendix, an object is defined as any entity that has a well-defined geometry and thus well-defined boundaries. A boundary is defined as an entity of dimension one less than the entity which it bounds: a three dimensional block is bounded by 2-dimensional faces; 2-dimensional faces are bounded by 1-dimensional edges, etc. Although these entities are of lower dimension, they exist in (at least) a 3-dimensional world. For tool path generation, only 1- and 2-dimensional entities need be considered.

Figure 4C:
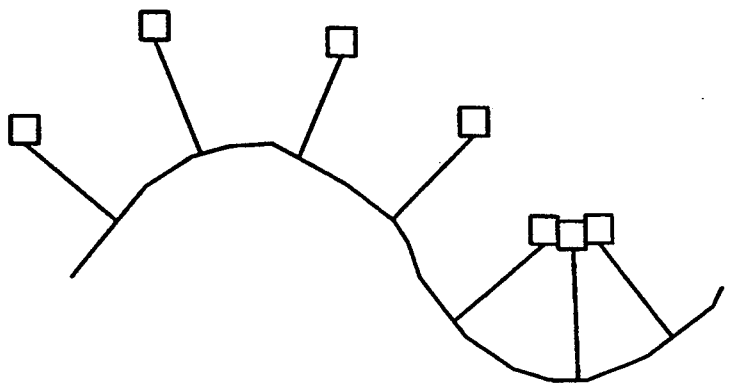
FIG. 4C shows an example of an algorithmic tool path generation on an object, according to the present invention.

In steps 4B-10 and 4B-11 a plurality of one-dimensional entities (toolpaths, possibly defined as a set of 0-dimensional entities, or points) are generated and tool attitude is provided automatically from objects to be considered. For the application of a uniform coating, where the tool is to apply a uniform coating of defined width at a defined rate, this problem simplifies to generating equally-spaced paths on the object. The spacing is defined by the effective width of the coating application. Those toolpaths are then projected onto the offset-surface where the projected lines plus the normal information along those lines define tool location and attitude. Since the tool is always normal to the surface, and tool speed is defined relative to the surface, not along the path, a uniform coating is assured as shown in FIG. 4C.

For special effects, i.e., boundaries with sharp edges, the above scheme requires only modifying some parameters. Where the boundary of an object requires special effects, the surface in question there has two boundaries. One boundary is the original boundary, where the special effect is applied. The other boundary is the boundary imposed by the original boundary, offset by the effective width of the special effect.

Once the coating paths, effects, and spray patterns have been defined, the amount of coating to be applied to the surface must be determined from the knowledge of the particular applicator characteristics in use and the physical characteristics of the coating to be applied. The coating thickness is determined in steps 4B-12 and 4B-13 based on the flow rate through the applicator for a given air pressure, paint pressure, paint viscosity, spray fan size, etc. This information will be used by the spray gun controller to determine the amount of time the valve will be open (pulse width) and the amount of time the valve will be open for a particular path (pulse frequency). The robot speed for the application of the coating is determined in steps 4B-14 and 4B-15 and is based on the previously determined parameters and desired coating effects. A set of program instructions is then compiled in step 4B-16 which are based on the previously determined information. These instructions will control the movement of the robot and the operation of the spray gun and related subsystems. This program will then be stored for later use.

Figure 5B:
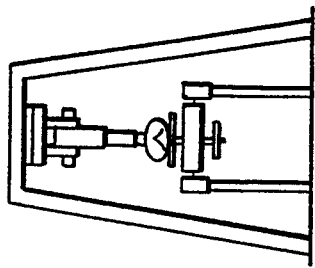
FIGS. 5A and 5B show, respectively, side and end views of an assembly line for coating art objects digitized for detailed coatings, in accordance with an application example of the present invention.
Figure 5A:
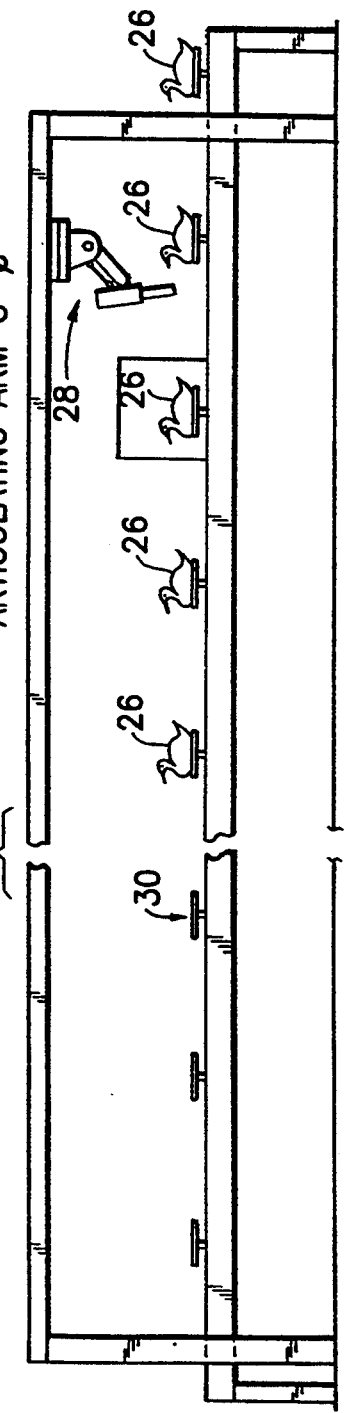

FIG. 5A shows a plurality of decoy ducks 26 being painted by an articulated arm 28 in an assembly line. Each duck 26 is mounted on a work piece holder 30 which can be adapted of course to coating any object. A side view is shown in FIG. 5A while an end view is shown in FIG. 5B. In the assembly line approach of FIG. 5A and 5B, the articulated arm is provided with a coatings applicator which may be equipped to coat more than one pigment. Such would be accomplished by means of valves under the control of the above-described computer program.

Automated duplication of precision or decorative coatings through the use of three-dimensional color digitizing and robotic coatings articulators such as shown in FIG. 5A and 5B is of course software driven. The hardware will depend on the application. The system's sophistication enables articulators to repetitively paint or coat detail on complex three-dimensional objects—one after another, much in the same way an artist actually would by hand, but with no inconsistencies. This approach provides an alternative to hand coating and/or masking which is generally the current technique being used in industry.

Figure 6:
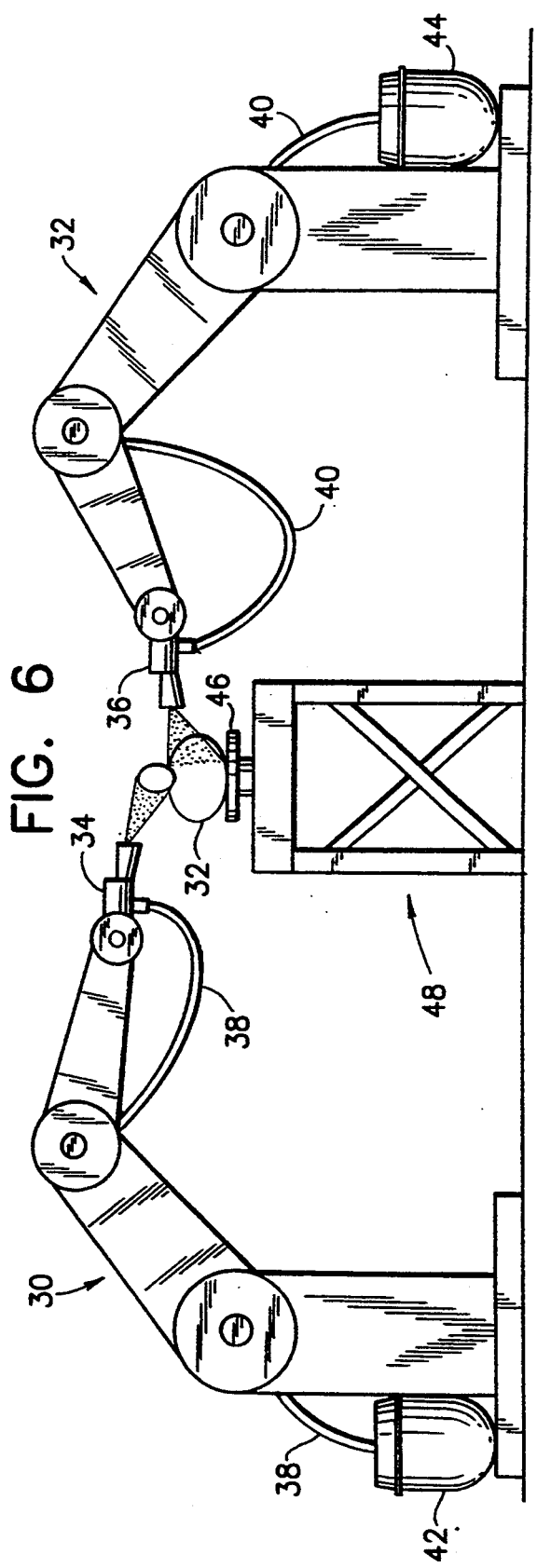
FIG. 6 shows an assembly line similar to that shown in FIGS. 5A and 5B except having more than one robot arm for coating the objects.

The approach shown in FIG. 5A and FIG. 5B may be speeded up by using more than one robot arm such as shown in FIG. 6. Instead of using just one articulator 28 a pair of robot arms 30, 32 are shown being used with one color being painted at each station. A duck 32 is shown being painted by the robot arm 30 on the left side and the robot arm 32 on the right side. Each robot arm 30, 32 is equipped with an applicator 34, 36 which is fed by a feed hose 38, 40 from a paint pot 42, 44. A workpiece fixture 46 is similar to the workpiece fixture 30 shown in FIG. 5A. The workpiece fixture 46 is carried in a conveyer system similar to that shown in FIG. 5A also, as indicated by a support structure 48.

Figure 7:
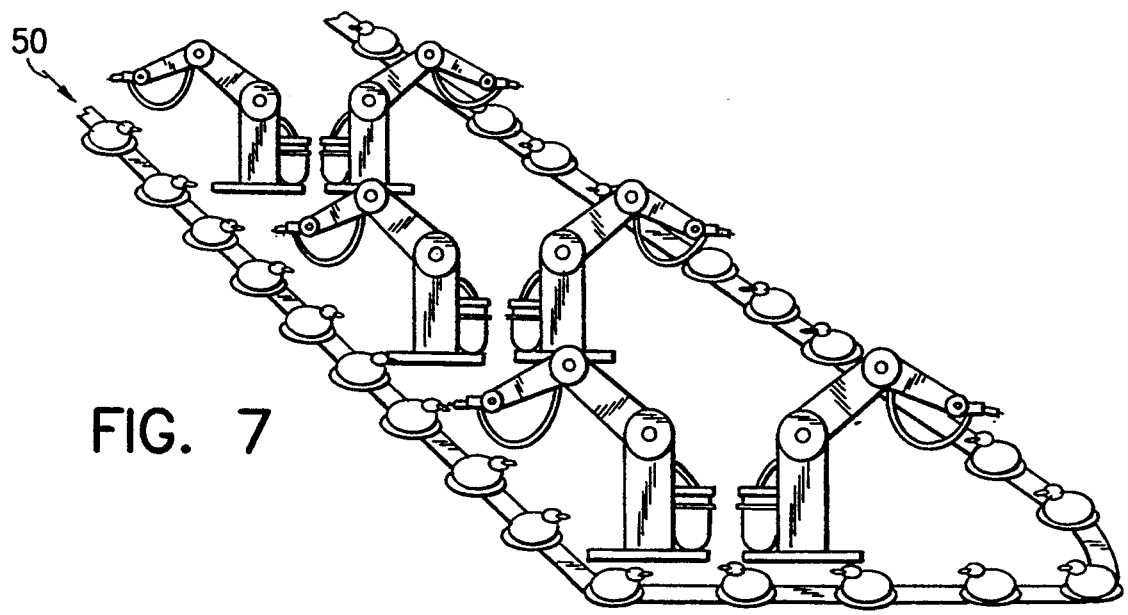
FIG. 7 shows an assembly line for coating a plurality of art objects using a large plurality of robot arms, each supplied with a separate color.

FIG. 7 shows yet another assembly line, according to the present invention, having a plurality of robot arms, each providing one or more colors onto the ducks shown on an assembly line 50 being processed in counter-clockwise fashion.

Each station shown in FIG. 7 might coat an object before it in a specific period of time as defined by the parameters determined by the software. Then to increase the speed of the assembly line, infrared drying devices may be placed between stations. Of course, as described previously, each object may be mounted on a workpiece fixture that may be a turnable to accommodate position of the object to be painted with respect to the applicator nozzle at the end of the articulated arm. This may be automated, as desired for a particular application using a display device similar to that which was already described.

Figure 8:
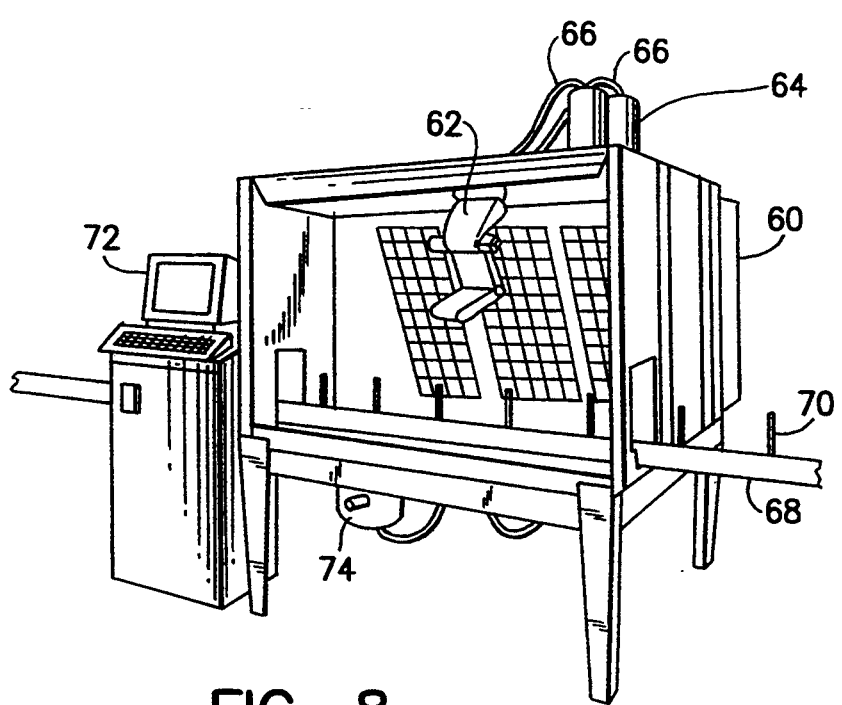
FIG. 8 shows an assembly line with a single six-axis articulated arm inside a cross flow spray booth and being controlled by a computer, according to the present invention.

Still another approach is shown in FIG. 8 where a spray booth 60 is equipped with exhaust fans for venting coatings fumes from the assembly line area. A six-axis articulated arm 62 is shown within the spray booth 60 for applying coatings from paint pot 64 via supply conduits 66. A conveyer belt or chain-on-edge conveyer 68 is shown passing through openings in the spray booth 60. The conveyer is in-line with indexing. The conveyer 68 is supplied with universal center point part holders 70 with which to mount the object to be painted. A computer 72 contains the controller with software required for controlling the coating process as executed by the articulated arm 62 in conjunction with the conveyer 68. A coatings material capture for recycling device 74 is shown underneath the spray booth 60.

Figure 9:
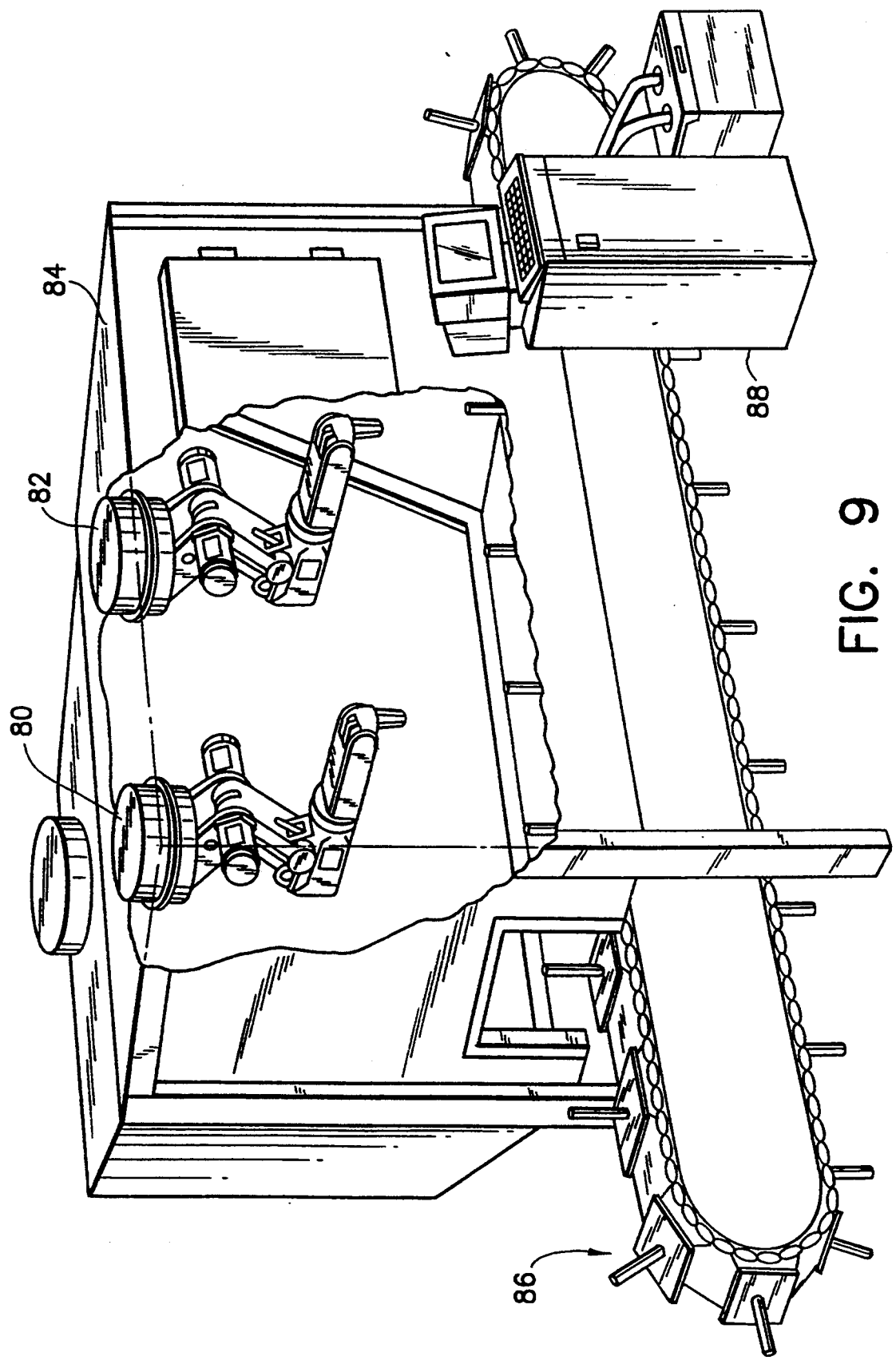
FIG. 9 is similar to FIG. 8 except showing a plurality of six-axis robot arms in a gantry position within a hood having a conveyor passing there through in endless fashion, according to the present invention.

Of course, more than one six axis articulated arm may be used as shown in FIG. 9 there. Two articulated arms 80, 82 are shown within a coating booth 84 similar to that shown in FIG. 8 with a chain-on-edge conveyer 86 and a computer controller 88. This represents a turnkey hardware system.

The product shown in FIG. 9 is capable of decorating arbitrary spatially sculptured objects to duplicate a previously decorated model through the coatings station line. If a new object's programmed information is stored at the production site, then changing from the currently coated object to that new object is immediate. If the new object's programmed information is not stored at the production site, the batch turn-around time required to set up this coatings station line for a new object may, for example, be less than 24 hours.

Figure 10A:
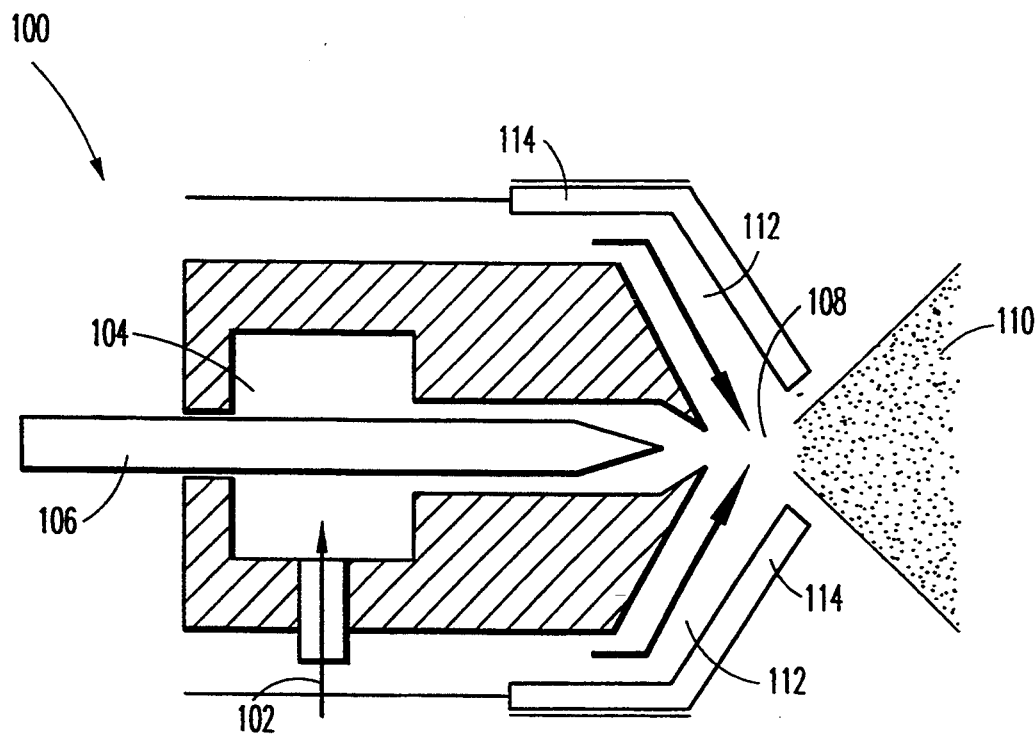
FIG. 10A shows a prior art coatings spray device.

FIG. 10A shows a typical prior art robotic coatings sprayer gun 100 wherein the coating material is supplied on a line 102 to a chamber 104 in the gun 100 by one of three means: gravity feed from an overhead supply, suction feed using the vacuum created by the sprayer air flow to draw up the coatings, and pressure feed whereby the coating is forced by air pressure into the spray gun. From the central chamber 104 the coating flow is controlled by a needle valve 106 to a nozzle 108. A coatings spray 110 comes out of the nozzle as a conical jet which is then atomized into a mist by compressed air 112. The geometry of the conical jet can be changed into a fan shape geometry through the use of additional external air jets 114. Note that there are two types of coatings/air mixing which can take place: in external mixing, the air atomizes the coatings a short distance from the sprayer tip; in internal mixing, the coatings and air mix right at the nozzle. Internal mixing is shown in FIG. 10A.

The sprayer design of FIG. 10A is not well-suited for detailed coatings application. In fact, such sprayers are designed to produce just the opposite effect. The air/coatings mixing schemes described above are designed to produce a broad flow of uniformly sized coatings droplets with the ultimate goal of covering a large surface as uniformly as possible.

According to an important teaching of the present invention, there are two key aspects of a coatings applicator for the present system: one, the coatings sprayer is designed to deposit coatings in areas as small as approximately one millimeter diameter spots; two, switching a plurality of pigmented coatings; and three, to mix the desired color of coatings on demand. This latter capability, although well suited to coating photo realistic renderings which use a continuous range of colors, is not particularly relevant to the presently described application. Examination of hand-painted duck decoys, for example, showed less than ten distinct colors in use. More important is the resolution of this coatings spraying. Line widths of one millimeter are consistent with the present application. Examination of pictures painted on to an absorbent paper using a commercial system showed reasonably sharp edges blurred by considerable bleeding of the paper. The edges showed some amount of overspray, but again this is a desirable characteristic in coating photos.

Figure 10B:
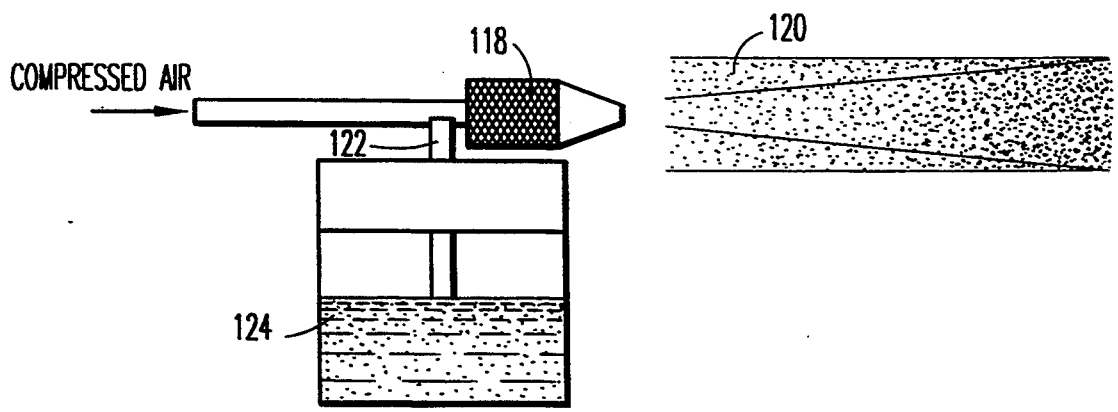
FIG. 10B shows a prior art airbrush.

Commercial artists produce detailed paintings using an air powered coatings applicator called an airbrush. Such a system is shown in representative form in FIG. 10B. Compared to FIG. 10A, an airbrush is much simpler, using an adjustable nozzle 118 with a narrow dispersion pattern 120. The coating is fed into the airbrush by the suction of the vacuum produced by the air flowing across the supply tube 122 from a coatings reservoir 124. Paint flows along an internal conduit along the airbrush needle and is drawn toward the tip of the needle by the vacuum effect of the air flowing through the airbrush. The paint is then atomized by the flow of air. It is this characteristic of the airbrush that allows fine paint lines to be rendered. The amount of coatings in the spray, as well as the characteristics of the spray are primarily controlled by manually adjustable nozzle which regulates the air flow. The spray pattern is influenced by the nozzle geometry.

An airbrush is capable of producing a variety of coating effects ranging from narrow lines to shading of colors. In fact, one of the major applications of airbrushes is to blend one color into another over a small area, i.e., in photo retouching.

A commercial precision coatings spraying system is available and known as the Michelangelo V4 Paint Jet System. The system is available from Data Mate Technologies of the Taro Building, 2-2-12, Fujimi, Chiyoda-ku, Tokyo, Japan. The system consists of (1) a color scanner to input up to 8.5×11 inch flat color art work;

(2) a standard PC which runs software to manipulate the image, i.e., you can crop, recolor, etc. the image; (3) an Iwata CS150P compressor; (4) a coating unit which consists of three coating nozzles using compressed air pressure feed for the coatings; and (5) an X-Y drive assembly similar to a computer plotter which can move the coating unit through a flat area of approximately 1.6 m × 1.6 m. The coating unit has three side-by-side coatings sprayers, one for each primary color-yellow, magenta and cyan. The atomization of air is always on and the painting supply is pulsed. The units can only be operated with the nozzle perpendicular to the coating surface which is always in effect a flat surface. This means that the individual sprayers never change color. The paint heads are purged with a water/alcohol solution and which is also used for cleaning the nozzles.

There are two aspects of the Data Mate technology system which are of note here. First, the paint sprayer is designed to deposit paint in spots as small as several millimeters in diameter. Second, the desired color of paint is mixed using the three primary colors by overlaying painted areas of different primary colors. This latter capability, although well-suited to painting photographs which use a continuous range of colors, is not pertinent to industrial coating applications which can use several distinct, pre-mixed colors or materials. More important to industrial coatings is the resolution of the spray applicator. Line widths of one millimeter are consistent with industrial requirements. Examination of pictures painted on to paper using the Data Mate system showed reasonably sharp edges blurred by considerable bleeding of the paper. The edges showed some amount of overspray, but this may be a desirable characteristic in photoreproduction.

A large number of commercial airbrushes are made by the Paasche Company Industrial Finishing Equipment, 7440 West Lawrence Avenue, Harwood Heights, Ill. 60656-3497 and are classified on the basis of their precision, not unlike how paint sprayers can be classified. Specifically, a Paasche "AB" airbrush can apply lines from 1/32-nd of an inch up to about one quarter of an inch. Other brushes such as the Paasche V1 can go from line widths of about one-sixteenth of an inch to about three-eighths of an inch. None of these airbrushes use either an aspirated paint feed such as that shown in FIG. 10B but rely on a vibrating reed paint supply mechanism. These devises are manually operated and, for fine resolution, require a significant amount of operator adjustment. (It is important to note in light of the present invention that no airbrush is known which can automatically influence the spray pattern through electro-mechanical means). Compressed air vibrates a reed which goes from the coatings reservoir to the airbrush nozzle. In most instances, the coating is gravity fed by the vibrating reed.

The artist's airbrush is capable of producing coating deposits on the order of one millimeter. This is existing technology. Reference works on airbrush technology include *Encyclopedia of the Airbrush*, Art Direction Book Co., New York 1981, by Stephen D. Rubelmann, *The Complete Airbrush Book*, Wm. Penn Publishing Co., New York, 1955, S. Ralph Maurello, *Advanced Airbrushing Techniques Made Simple*, TAB Books, Blue Ridge Summit, Pa., 1985, Carl Cianti.

Most artist's airbrushes are similar to the Paasche Company's brushes and rely upon the wrist motion of the artist and the artist's manual adjustments of the nozzle to get the desired effect. Other technologies may be used to carry out the present invention but, at the present time, a variant of the artist's airbrush approach is preferred. Other technologies such as pressure fed pads similar to marking pens or a power fed coatings brush similar to commercial units for home coating on the market as well as ink jet technology could be used.

Air pressure and nozzle aperture need to be controlled as well as the angle between the axis of the applicator and the surface being painted. Other parameters such as the coating supply feed pressure and air pressure may be controlled as well.

The control of applicator's angle with respect to the surface normal is not particularly important in the prior art but is especially important, according to the present invention, for detailed automated coating application.

Figure 11:
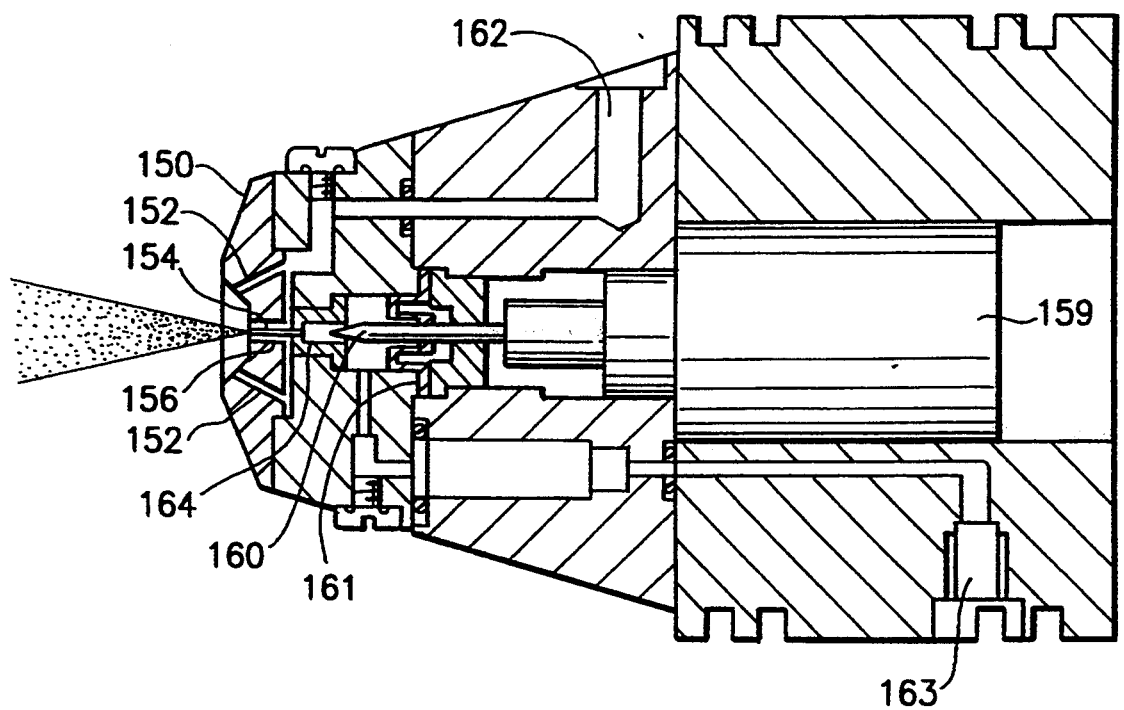
FIG. 11 shows a precision electronic coating applicator (PECA) according to the present invention.

FIG. 11 shows a precision electronic coating applicator (PECA), according to the present invention. FIG. 11 is a section view which shows the end cap 150 of FIG. 12A having fan airjets 152. Only the top fan jet passage 152 is shown being supplied by an air inlet 162 but the lower passage would be similarly supplied by a similar air inlet and channel. Similarly, the atomization air channel 156 which surrounds the nozzle 154 would be similarly supplied with an air passage or air inlet that is not shown. Each of these separate air passages are separately controlled, for example, by means of external valves, although the valves could certainly be internal to the PECA. It should be realized, however, that the top and bottom fan airjets 152 of FIG. 11 could be supplied by the same air inlet 162, if there is no desire to control them separately.

The PECA of FIG. 11 also shows a solenoid 159 for controlling a needle 160 in a coating fluid chamber 164 that feeds the nozzle 154. The degree of insertion of the needle 160 as controlled by the solenoid 159 controls the amount of coating fluid that is delivered to the nozzle. A coating inlet 163 provides pressurized coating fluid to the chamber 164. A compliance seal 161 allows the needle to be moved in and out of the chamber, as controlled by the solenoid 159.

Figure 12A:
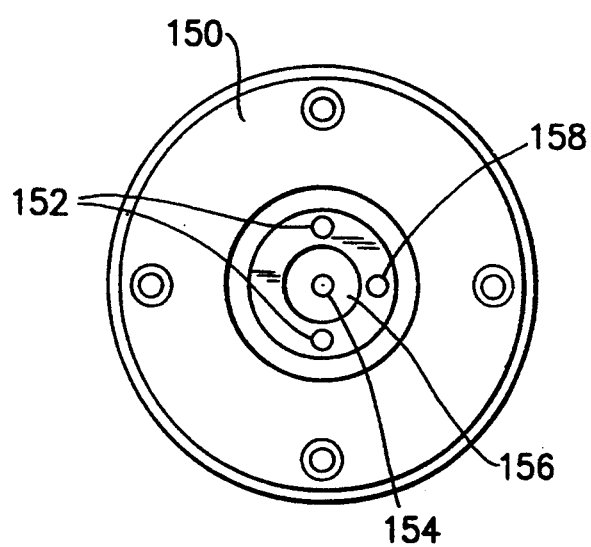
FIG. 12A shows the applicator air cap of FIG. 12 in plan view.
Figure 12:
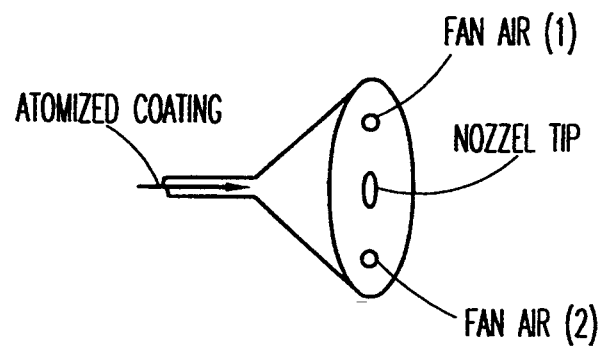
FIG. 12 shows a perspective view of an applicator air cap with a plurality of spray fan jets for control of spray fan shape, according to the present invention.

FIG. 12A shows an air cap 150 such as shown in FIG. 12 except shown in plan view. Fan airjets 152 are shown on either side of a coatings nozzle 154 surrounded by an atomization air channel 156. A steering airjet 158 is also shown.

Figure 13A:
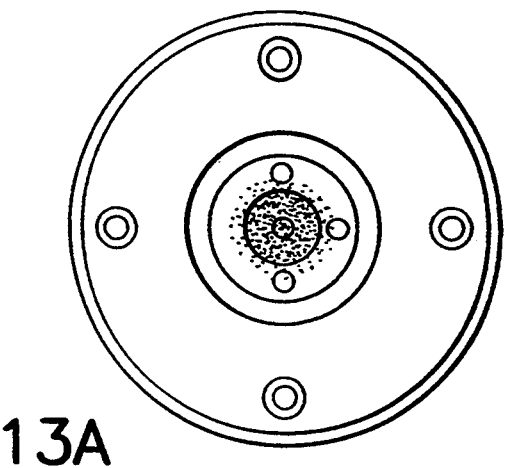
FIG. 13A shows the pattern of FIG. 13 from an air cap end-view perspective.
Figure 13:
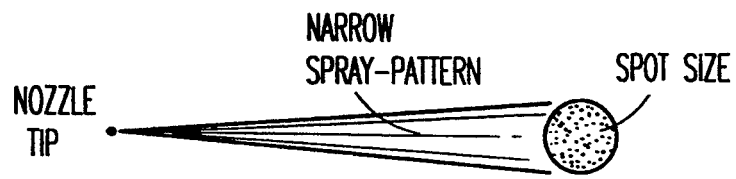
FIGS. 13 and 14 show examples of different width spray-patterns, according to the present invention, produced by an automatic precision electronically-controlled applicator which has the ability to vary spray-pattern width, as shown in FIG. 12.
Figure 14:
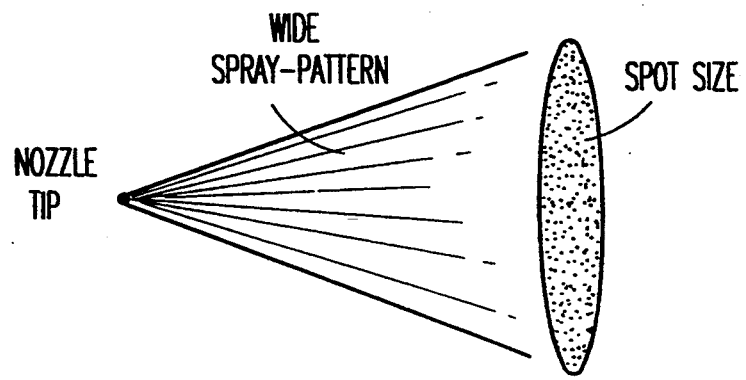
Figure 14A:
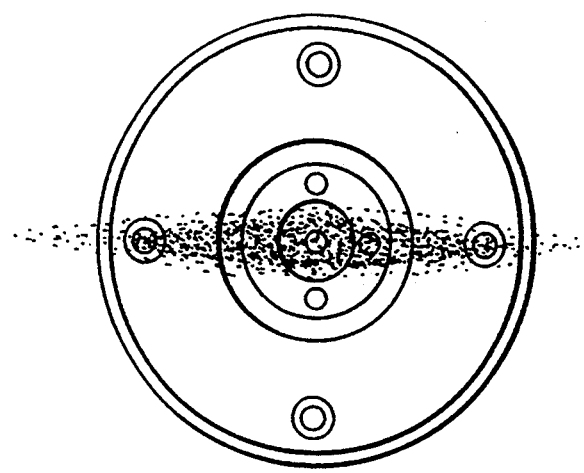
FIG. 14A shows the spray pattern of FIG. 14 from an air cap end-view.
Figure 14B:
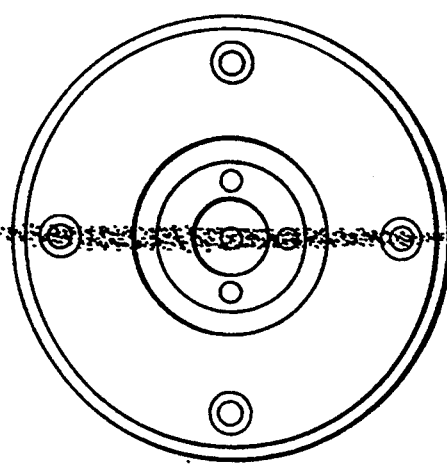
FIG. 14B shows a very narrow spray-pattern as seen from an end-view of the air cap of FIG. 12A.

A narrow spray pattern is shown in FIGS. 13 and 13A, produced by the reduction or elimination of air flow through the air cap assembly, as shown in FIG. 12 and 12A; while a wide spray pattern, shown in FIGS. 14 and 14A, is caused by the influence of controlled airjets in the air cap assembly of the applicator. A very wide spray pattern is shown in FIG. 14B.

Figure 14C:
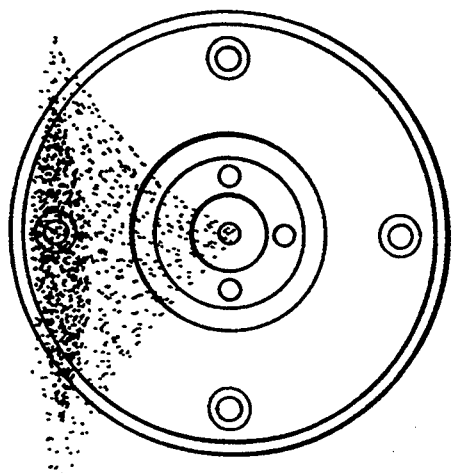
FIG. 14C shows the air cap of FIG. 12A with the steering air jet utilized to "steer" the spray pattern to the side of the air cap.

FIG. 14C shows an illustration of a usage of the steering airjet 158 of FIG. 12A wherein the spray pattern is moved to the side of the aircap 150. The degree of side-movement of the pattern depends on the magnitude of the steering airjet.

Figure 15:
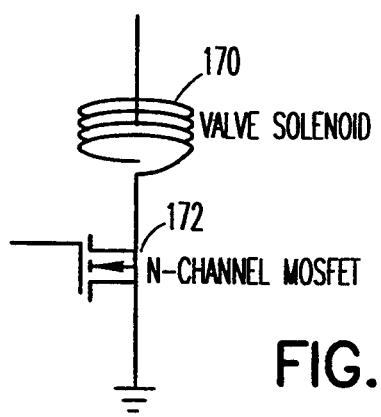
FIGS. 15 and 16 show drive circuits used to operate an electronically controlled applicator, according to the present invention.
Figure 16:
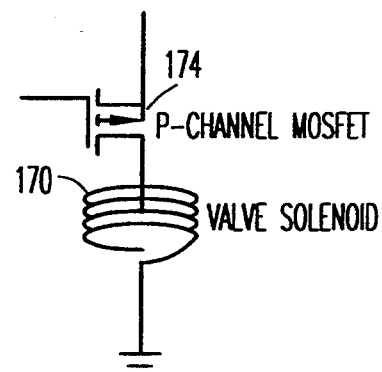

FIG. 15 shows control approach for a sprayer such as shown in FIG. 11. The valve solenoid is fitted into the airbrush adjustable nozzle section of FIG. 11 and powered with an appropriate voltage such as plus 12 to 48 volts DC which is then connected into a switch such as an n-channel mosfet as shown which is then grounded or hooked into a common return path. Literally, the valve solenoid 170 may be hooked up as shown in FIG. 16. FIG. 16 shows a similar hookup except this time using a p-channel mosfet in series with the valve solenoid 170.

Optimal control voltages would be 12 to 24 volt DC but others can be used as well. By keeping the drive voltage less than or equal to 24 volts, the device becomes intrinsically safe to use in combustible atmospheres such as those encountered in coatings applications. Ideally, the valve control solenoids should be able to be pulsed at a maximum rate of two kilohertz with a minimum "on-time" of 150 microseconds. Solenoids may be controlled using either low side or high side driver mosfets as shown in FIGS. 15 and 16. Coatings deposition is controlled by either pulse width modulation (PWM) or pulse position modulation (PPM). The low side, n-channel mosfet valve driver circuit of FIG. 15 is a commonly used technique for driving a valve solenoid. The main disadvantage is that the coil, even though the valve is closed, is electrically "hot". Should an internal ground fault develop in the coil windings, the valve will turn on regardless of the state of the driver mosfet, as long as DC power is supplied to the coil.

The hook up of FIG. 16 depicts a high side, p-channel mosfet valve driver circuit. The use of the high side driver has the advantage that the coil is deenergized until turned on by the mosfet. Should an internal coil fault to ground develop, the valve will remain closed.

Figure 17:
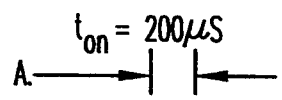
FIG. 17A–C shows a pulse position modulation technique for modulating a valve for delivering differing amounts of coating to an applicator, according to the present invention.
Figure 17:
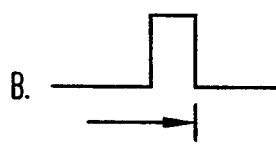
Figure 17:
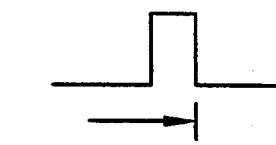
Figure 17:
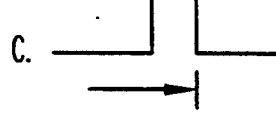
Figure 18:
FIG. 18D–F shows a pulse width modulation technique for delivering different amounts of coating through a valve controlled by the varying pulse widths in an applicator, according to the present invention.
Figure 18:
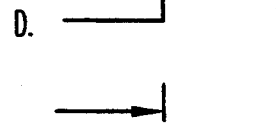
Figure 18:

As explained above, the gun can be controlled through either PPM or PWM techniques. FIG. 17 and 18 illustrate the comparison between PWM and PPM, respectively. The time period illustrated in both figures is the same for all the traces or waveforms. In pulse position modulation (PPM) of FIG. 17, the solenoid valve is open for a brief period, in this case 200 microseconds and the repetition rate of the pulse is varied to achieve the desired coatings deposition. FIG. 17A shows five 200 microsecond pulses occurring in the given time period which yield an effective valve open time of 1,000 microseconds (1 millisecond). Likewise, traces shown in FIGS. 17B and 17C represent valve open times of 600 microseconds and 400 microseconds, respectively.

FIG. 18 shows pulse width modulation (PWM). FIG. 18D and FIG. 17A, even though the opening time for both is one millisecond, cause different results. For a given gun velocity with respect to the surface being painted, a PWM driven gun such as shown in FIG. 18 will yield a heavier coating deposit over a smaller linear distance then would a PPM driven gun such as in FIG. 17. The PPM drive of FIG. 17 allows for more flexibility in the deposition of coatings onto the surface. With the ability to vary both the pulse repetition rate and the gun velocity, the PPM techniques of FIG. 17 provides a higher degree of adjustment of the coatings deposition for high precision coating than does PWM techniques as shown in FIG. 18. The PWM techniques of FIG. 18 are adequate for coarse coating, requiring less accuracy with materials where the amount of deposited material is less critical.

Figure 19:
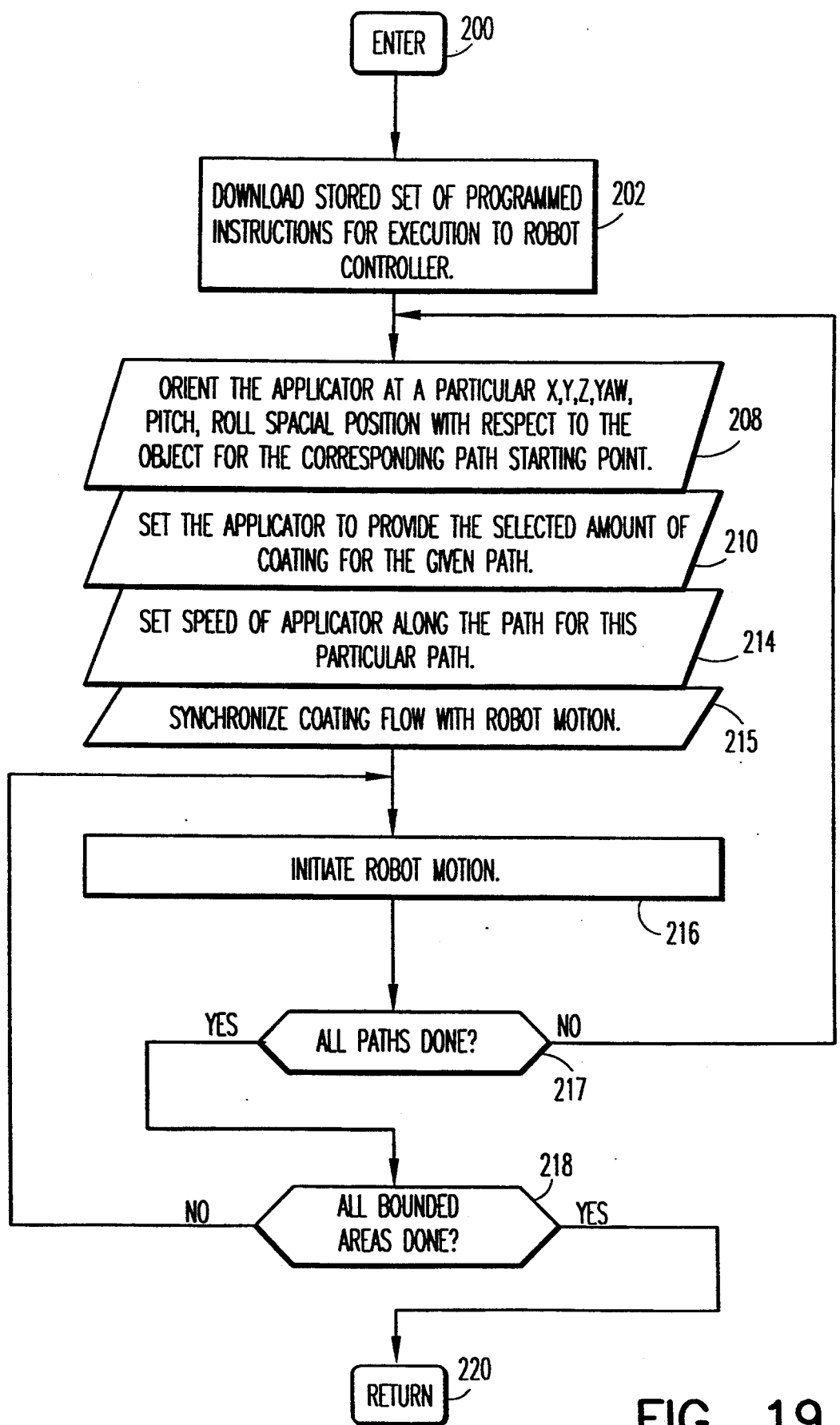
FIG. 19 shows execution of a set of programmed instructions such as produced in accordance with the procedure described in connection with FIGS. 1–4 and 4A and 4B in a specific system, such as that shown in FIG. 20.

Referring now to FIG. 19, it will be recalled that a set of programmed instructions were stored for execution in the Step 4B-16 of FIG. 4B after going through the steps shown in FIGS. 1, 2, 3, 4, 4A, 4B for storage in a memory for later use in a system such as shown in FIG. 9. FIG. 19 shows such a set of programmed instructions being executed for carrying out the coating of an object using a system such as shown in FIG. 9 and as shown in more detail in FIG. 20.

Figure 20:
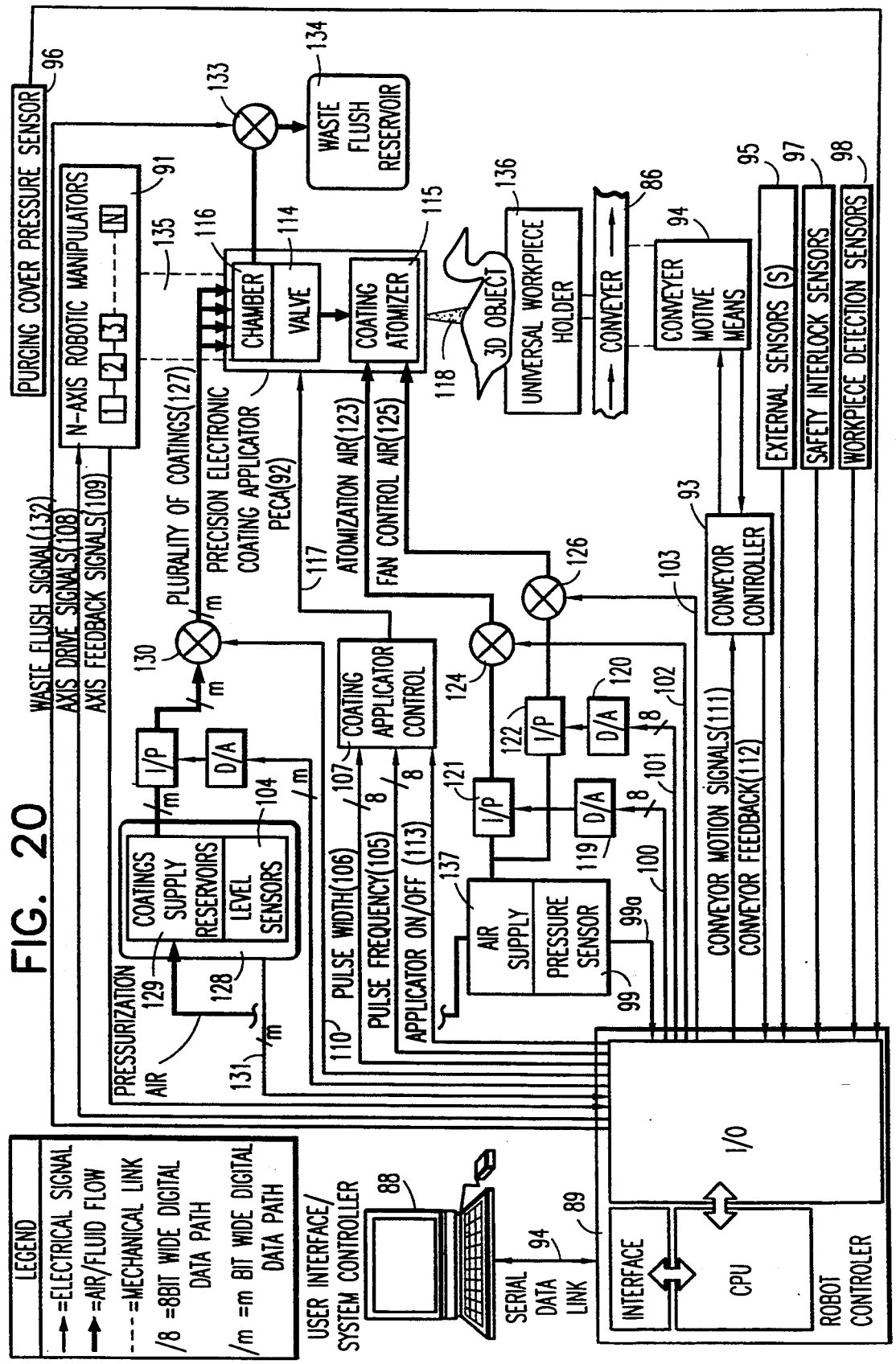
FIG. 20 shows an embodiment of the present invention for a flexible manufacturing coatings system incorporation an automated precision electronically controlled coatings application apparatus, such as previously described, for example, in connection with FIGS. 5A and B, FIG. 6, FIG. 7, FIG. 8 and FIG. 9.

FIG. 20 shows a controller 88 such as shown in FIG. 9 having a general purpose computer which may include a microprocessor, a Random Access Memory (RAM) storage means, magnetic or optical storage, video display keyboard, and pointing device, e.g., mouse, for storing a set of programmed instructions stored in step 4B-16 of FIG. 4B. In that case the controller 88 will cause the program instructions to be retrieved and downloaded into a robot controller 89 by a serial data link 94, for example. The robot controller 89 of FIG. 20 interfaces to an N-Axis robot arm 91, a precision electronic coatings applicator 92 (PECA), a conveyor controller 93 for controlling a conveyer 86 by means of motive means 94, a plurality of external sensors 95, 96, 97, 98, 99, 104 which may be used in a general feedback control system for safety interlocks. A plurality of output control signals are provided by the robot controller 89 on lines 100, 101, 102,103, and 110 for controlling the precision electronic coatings applicator 92; these signals provide precise control of the coatings flow, air flow, atomization air, and fan air of the PECA 92. Another major group of signals on lines 108 and 109 associated with the N-axis robot arm 91 provide control and feedback for the robot arm to which applicator 92 is attached. A third group of major signals on lines 111 and 112 are associated with control of the movement of conveyor 86 upon which the 3-D object is placed. The signals on lines 105 and 106 determine the pulse frequency and pulse width respectively, of coating applicator control 107 while an applicator on-off control line 113 provides over-all on-off control of the applicator control 107 which drives valve 114 in applicator 92. Applicator control 107 communicates with applicator valve 114 by a signal line 117; since in the example the signal lines 105 and 106 are 8-bit wide digital data paths, delivery of more or less coating through applicator 92 is controlled by the digital values on these lines presented to coating applicator control 107. This influences the amount of paint delivered in spray pattern 118 delivered by the applicator onto the 3-D object. Signal lines 100 and 101 are also 8-bit digital data paths connected to current mode digital-to-analog converters 119 and 120 respectively. Digital to analog converter 119 provides control of current to pressure regulator 121 that provides atomization AIR 123 through control valve 124 to the coatings atomizer 115 in applicator 92. The on-off control of the atomization air is accomplished through solenoid value 124 driven by control signal 102 from controller 89. Similarly, digital-to-analog converter 120 controls current to pressure regulator 122 which controls the fan air pressure 125 to the coating atomizer 115 in applicator 92. Similarly, on-off control of fan air is provided through solenoid valve 126 driven by the signal line 103. Pressurized air is provided to the system 137 which includes pressure sensor 99 which provides a feedback signal on a line 99a to the robot controller 89 indicative of the status of compressed air to the system. A plurality of coatings 127 is supplied to applicator chamber 116 via appropriate conduits from a coating supply system 128 comprised of a plurality of coating supply reservoirs 129, level sensors 104 and control valve 130. Since the coating supply reservoirs are under pressure, flow control to chamber 116 of applicator 92 is controlled by a plurality of valves 130 which are in turn controlled by a plurality of signals 110. Level sensing feedback signals are provided to the controller 89 through an m-bit wide digital data path 131. A method to dynamically change coating materials is provided through the use of waste flush solenoid valve 133 into waste flush reservoir 134.

Waste flush valve 133 is controlled by a waste valve flush signal 132 from controller 89. This mechanism allows coatings to be changed and flushed from chamber 116 of applicator 92 during the coating process of the 3-D object. The signals on line 100 controlling digital-to-analog converter 119 and current-to-pressure regulator 121 allow for dynamic control of atomization air 123 in coatings atomizer 115 of applicator 92. This dynamic control provides for precise regulation of the atomization air in atomizer 115, yielding precise control of the flow rate of the coating material through applicator 92. Signal line 101 controlling the digital-to-analog converter 120, which in turn controls current-to-pressure converter 122, provides precise control of fan air 125 to the coating atomizer for controlling the "cone" of the spray pattern. This control allows for the change of the spray pattern as depicted in FIGS. 13 and 14 from a narrow circular pattern to a wide, flat pattern. Of course this may be continuously variable as desired, or may be provided in steps according to the programmed instructions from robot controller 89.

The axis drive signals on line 108 are a plurality of signals that control the axis drive units of the robotic manipulator 91 that position the robot end-effector to an X, Y, Z point in space above the surface of the 3-D object. The axis feedback signals on the line 109 include a plurality of signals providing feedback from the axis drive units of manipulator 91 to controller 89. The N-axis robot manipulator 91 is attached to coating applicator 92 through a rigid mechanical linkage 135. This rigid mechanical linkage provides precise predictable positioning and orientation of applicator 92 above the 3-D object to be coated with respect to manipulator 91.

After retrieving a stored set of programmed instructions from the memory of system controller 88 and downloading them through serial data link 94 into robot controller 89 for execution as shown in step 202 in FIG. 19, the programmed instructions are then executed by the robot controller 89 as illustrated in step 208 in FIG. 19. The coatings applicator 92 is oriented to a particular X, Y, Z, yaw, pitch, roll spatial orientation with respect to the surface of the 3-D object for the corresponding path starting point as shown in step 208 in FIG. 19. In step 210 of FIG. 19 the applicator is set to provide the selected amount of coating for the given path through configuration of signal lines 100, 101, 105, and 106. Step 214 of FIG. 19 sets the applicator speed along the path for the particular path to be executed. In Step 215 of FIG. 219, robot motion and synchronization of coating flow are controlled through signals lines 102, 103, 108, 109, and 113 until the particular path is completed. Steps 208 through 217 in FIG. 19 are executed repeatedly until step 218 determines that all areas are done. Once completion of the coating of the 3-D object has been determined, a return is made on a step 220 in FIG. 19 and conveyor motion signals 111 are provided to the conveyor controller 93 to instruct conveyor motive means 94 to index the conveyor 86 so that the next 3-D object awaiting coating is presented to the robot applicator unit 91, 92, 135. The workpiece holder 136 attached to conveyer 86 may be exchangeable or universally adaptable so that it can hold a plurality of 3-D objects. Positional feedback of the new 3-D object to be coated is provided through conveyor signal 112 to controller 89 for repeat of the previously described coating process.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

APPENDIX

Robot Software System Functional Specification

The robot software system must support several different types of operations to constitute a complete, easy-to-use system. The system must contain many high-level representations of complex objects or systems so that it can support abstract (i.e., intuitive and simple) operations by the user to develop an object that can be visualized by the system and then generated by the robot and the tool. These high-level representations will utilize objects.

Terms

Tool—a device which is attached to the end of the robot (i.e. end-effector) that is used to achieve the desired work product. Tool can be a coatings applicator, adhesives applicator, plasma torch, grinding device, buffing device, etc.

Object—a software construct that allows grouping of /data and code into one entity called a class. Such entities can be reused through the mechanism of inheritance. An example: define the class sphere with the property radius and a generic method for calculating volume: Volume=4/3 pi(radius)**3. An instance of sphere can be created with a specific radius and this instance can, when queried for the volume, supply the correct value. This generic function would be defined for other objects such as blocks and cylinders so that the notion of the abstract operation volume is supported by different classes of objects. This abstraction mechanism is called polymorphism. Now define a class physical-object with properties density and velocity and methods for calculating momentum: p=mass*velocity, mass: mass=volume*density and kinetic energy: E=½(mass,-velocity**2). We can now define a class ball which inherits from both sphere and physical object: ball can calculate not only its volume, given a radius, but also its mass, momentum and kinetic energy given its density and velocity. If we define yet another class, baseball, we can assign a default radius of 1.5 inches and a default density of 0.6 and new property color="white with red stitching". This object can perform all the operations of a sphere and a physical object.

At the highest level, the system must support the following operations:

1. Input of (point, curve, surface, solid) data in (DXF, IGES, PDES) format.
2. Organization of input data into system primitives (features)
3. User interaction with graphical model of above to develop final object to be tooled
4. Generation of robot commands to realize said object.

2. User Interface Functional Specification

The user interface is what the end-user sees when he uses the system, and how he interacts with the system. Most of the interaction will be done through mouse picks, with a limited amount of text entry—only when the user must supply a name of something.

The system may be conveniently divided into two parts—graphics and menus. The graphics is the non-textual part: the objects to be interacted with are shown more or less realistically as they would appear to the user in real life. The menus deal with things, usually desired operations, which are more conveniently described in words.

The graphics system assumes the existence of geometrical objects that can supply the necessary information such as faceting that is needed for rendering. The graphics system must therefore:

1. Be capable of rendering, in both 2D and 3D, at least the object to be tooled. Limited rendering of the robot and tool object would be desirable.
2. Be capable of manipulating the rendered objects through mouse picks and have the corresponding objects changed accordingly. These changes could include geometric transformations (translation and distortion), deletion and creation of features and other changes, such as color.
3. Be able to support user-assigned properties such as names.
4. Allow, through user interaction, organization of a set of input geometries (such as scanned data in DXF format) into a set of features which the robot driver can use to generate toolpath data instructions The menu part of the system would support all non-graphic operations. The following operations would be among the choices:

1. open a file of point data (IGES or DXF) to input to the system
2. option to convert point data into primitive geometry.
3. option to organize primitive geometry into features
4. option to visualize geometry
5. option to create, add, move or delete features
6. option to pick a feature to assign tooling characteristics to.
7. menu of tools to apply (where appropriate) i.e., aperture size of coating tool
8. menu of tool specific characteristics for chosen tool, i.e., spray widths of coating tool
9. option to generate toolpath
10. option to visualize toolpath Many of the above options would be nested into pull-down menus so that the user was not subjected to the death of 1000 menus 11. option to send commands to robot
12. option to save commands to file
13. option to save objects
14. option to send presaved commands to robot
15. option to add presaved commands as user menu options (pattern choices, etc.)

3. User Interactor Objects Functional Specification

User interactor objects will serve as the interface between people and the system of software objects that constitute the product. These objects must, as a collection, support all interactions and operations envisioned: there should be one class of object for each operation. Hybrid objects (objects supporting more than one type of operation) should be possible through class inheritance.

These objects, while relying on a specific hardware/windowing/operating system platform for implementation at some level, should be non-platform-specific at least at the top level so that the user interface is portable across platforms without redesign.

These objects must do the following:

1. Support picks from a menu
2. Support toggling from a mouse pick
3. Support picks from graphics: pickable faces, curves and points
4. supply drag and drop operations of window and graphic entities
5. supply notification pop-ups
6. allow text input and (limited) editing
7. Support iconization 4. External Geometry Driver Functional Specification The external geometry driver object is responsible for translation between external geometry representations and system geometry primitives (features). Initially, translation from a static DXF file to system primitives is adequate, but other formats such as IGES, PDES and CAD system representations may be desired. Geometry output may also be desired.

The driver object must support the following operations:

1. read a (DXF) formatted file and store the geometric and color data.
2. convert the geometric and color data into system primitives 5. Geometry Objects Functional Specification Terms Feature: a (partial) geometric object, such as a hole or boss, which may used to constitute a more complicated object.

Transformation: either a translation of a rigid body (plain movement in space) or a distortion, such as stretching an object along an axis.

Geometry objects will provide the representation of physical objects: solids, surfaces, curves and vertices. These objects will allow the representation of sub geometry, referred to as features. Features may be described recursively: a boss may have a hole.

Geometric objects must therefore:

1. Maintain all geometric information about an object: i.e.,
   a. topology
   b. orientation
   c. geometry used for construction of object, where necessary
2. Support query and transformation requests
3. Support addition, manipulation and deletion of features
4. Maintain geometric veracity under the above operations. Deleting a face of a cube would change the cube from a solid to a collection of 5 faces.

6. Robot Kinematic Object Functional Specification

The robot kinematic object will be the system's internal representation of the physical robot. This model, when supplied to the robot driver object, will allow the driver to generate the necessary commands to generate toolpath and tool commands.

The robot kinematic object should therefore:

1. Contain a complete model of the robot characteristics: physical dimensions, masses, maximum and minimum speeds, ranges of motion, moments of inertia.
2. Support queries of above information 3. Given a toolpath, determine whether the robot can possibly follow it. This may involve collision detection between robot elements.
4. Retain state information about position and velocity of the robot.

7. Tool Object Functional Specification

The tool object is the system's internal representation of the tool at the end of the robot arm. It will contain all information about that tool necessary for the robot driver object to use in the specification of robot commands applying that tool to some object.

The tool object should do the following:
1. Contain a physical model of itself (dimensions, mass, moments of inertia)
2. Contain models of various requested operations that may affect desired speed or orientation along the toolpath
3. Support queries of above information
4. Maintain state information of tool.

8. Robot Driver Object Functional Specification

The robot driver object will serve as the final input-/output device of the system. It will be responsible for converting the internal representation of the object to be treated by the robot and tool to actual robot and tool commands. The driver will be robot-specific and may therefore rely on specific capabilities of the robot software for command (and path) generation. Any feedback from sensors must be recognized and handled accordingly.

The robot driver object must therefore:
1. Accept feature-based geometric objects for input
2. Using object models for robot and tool characteristics, generate toolpath(s)
3. Generate robot and tool commands and send them to the robot.
4. Interact with external system sensors and devices.

Considerations

The toolpath will contain speed information, which the driver has generated explicitly from its knowledge of the tool characteristics stored in the tool object and the object to be tooled.

The toolpath will contain (implicitly) tool orientation information which the driver object has generated explicitly from knowledge stored in the features of the object to be tooled.

9. Relation Objects Functional Specification

Relation objects are abstract objects that connect other objects in a variety of ways. One example is the connection of a solid block object with its face, edge and vertex objects. The edge objects are shared between two faces: the connection objects, in this case boundary relation objects, contain that associativity.

Relation objects must therefore do the following:
1. Support a variety of associations including that described above
2. Allow addition and deletion of associated objects
3. Support appropriate notification of associated objects of change to objects
4. Support change of themselves: a relation may become more or less specific, with notification to associated objects.

What is claimed is:

1. A precision coating apparatus, comprising:
   an articulated robot arm having a coating applicator mounted thereon, responsive to an arm control signal, for applying a coating to a three-dimensional surface of an object along a coating application path on the three-dimensional surface of the object at various applicator positions and angles with respect to a normal to the three-dimensional surface of the object dictated by the arm control signal;
   a coating supply connected to the coating applicator, wherein the coating applicator is responsive to a coating supply control signal, for providing the coating in various controlled amounts to the surface of the object; and
   a controller, responsive to a series of stored instructions, for providing the arm control signal and the coating supply control signal.

2. The apparatus of claim 1, wherein the stored instructions provide the coating supply control signal to control the coating provided in said amount controlled by pulse width or pulse position modulation.

3. The apparatus of claim 1, further comprising:
   a conveyor, responsive to a conveyor control signal, for conveying a plurality of objects past the articulated arm for being coated by the coating applicator and wherein said controller is responsive to said series of stored instructions for providing said conveyor control signal.

4. The apparatus of claim 3, further comprising a plurality of articulated robot arms having separate, differently colored coating supplies and having separate coating applicators mounted thereon; each robot arm and associated coating applicator responsive to separate coating supply and arm control signals from the controller which has separate stored instructions for each articulated robot arm and coating applicator, each arm and applicator for applying a coating to the object along different coating application paths within different delineated areas of the three-dimensional surface of the object at various positions and angles with respect to the three-dimensional surface of the object dictated by the corresponding coating supply and arm control signals and wherein the controller provides the conveyor control signal for conveying the objects past each articulated arm and associated coating applicator.

5. The apparatus of claim 1, wherein the controller provides a pattern control signal and wherein the coating applicator is responsive to the pattern control signal, for controlling the magnitude of a solid angle of coating applied to the object.

6. The apparatus of claim 1, wherein the controller provides a speed control signal and wherein the robot arm is responsive thereto for controlling the speed of the applying of coating at the various positions.

7. Apparatus for using a signal representation of a surface of a three-dimensional object, comprising:
   means responsive to the signal representation of the three-dimensional object for selecting a plurality of areas of the surface for application of a corresponding plurality of differently colored coatings and for providing area delineating signals indicative thereof; and
   means, responsive to the area delineating signals, for selecting, for each of the plurality of areas, a coating application path of points along the surface and for selecting a corresponding selected spray pattern, coating amount and application angle from a normal to the surface, for each of the points along the surface and for providing an arm control signal and an object control signal for each such point.

8. The apparatus of claim 7, further comprising:

means responsive to the object control signal for orienting the object with respect to a coatings applicator;

means responsive to the arm control signal for orienting the coatings applicator with respect to the object for applying the corresponding colored coatings at each point of the coatings application path at the corresponding selected angle from the normal to the surface at said each point and with the corresponding selected spray pattern and coatings amount.

9. The apparatus of claim 8, wherein the means responsive to the arm control signal controls the speed of the coatings applicator along the coatings application path.

10. The apparatus of claim 7, wherein the arm control signal controls the coatings amount by pulse modulation.

* * * * *